US012613920B2

(12) United States Patent
Higgins et al.

(10) Patent No.: US 12,613,920 B2
(45) Date of Patent: *Apr. 28, 2026

(54) ENHANCED PROCESSING OF TIME SERIES DATA VIA PARALLELIZATION OF INSTRUCTIONS

(71) Applicant: Palantir Technologies Inc., Denver, CO (US)

(72) Inventors: Andrew Higgins, Brooklyn, NY (US); Thomas Powell, London (GB); Willi Raschkowski, London (GB); Samantha Woodward, New York, NY (US); Benjamin Duffield, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/020,146

(22) Filed: Jan. 14, 2025

(65) Prior Publication Data

US 2025/0181646 A1 Jun. 5, 2025

Related U.S. Application Data

(63) Continuation of application No. 18/483,042, filed on Oct. 9, 2023, now Pat. No. 12,248,519, which is a
(Continued)

(51) Int. Cl.
G06F 16/903 (2019.01)
G06F 16/901 (2019.01)
G06F 16/907 (2019.01)

(52) U.S. Cl.
CPC .... G06F 16/90335 (2019.01); G06F 16/9027 (2019.01); G06F 16/907 (2019.01)

(58) Field of Classification Search
CPC ......... G06F 16/90335; G06F 16/24532; G06F 16/2264; G06F 16/2423; G06F 16/211; G06F 16/248
(Continued)

(56) References Cited

U.S. PATENT DOCUMENTS 6,704,724 B1 * 3/2004 Ellmann ........... G06F 16/24532
707/999.005
9,335,911 B1 * 5/2016 Elliot .................. G06F 16/2423
(Continued)

OTHER PUBLICATIONS

U.S. Pat. No. 11,151,197, Enhanced Processing of Time Series Data via Parallelization of Instructions, Oct. 19, 2021.
(Continued)

*Primary Examiner* — Shahid A Alam
(74) *Attorney, Agent, or Firm* — Knobbe, Martens, Olson & Bear, LLP

(57) ABSTRACT

Systems and methods are provided for enhanced processing of time series data via parallelization of instructions. An example method includes receiving a query indicating time series datasets and operations to be performed on the time series datasets. Nodes associated with the query are identified, with each node associated with a time series dataset. Nodes associated with operations to be performed are generated. The nodes are assembled into query tree, with parent nodes of the query tree indicating operations that are to be applied to children nodes. Instructions for processing the query tree are generated. At least a subset of the instructions is provided to one or more compute systems for processing in parallel. Results are received, and presented in a user interface.

20 Claims, 8 Drawing Sheets

Related U.S. Application Data continuation of application No. 17/450,924, filed on Oct. 14, 2021, now Pat. No. 11,816,164, which is a continuation of application No. 16/533,016, filed on Aug. 6, 2019, now Pat. No. 11,151,197.

(60) Provisional application No. 62/733,515, filed on Sep. 19, 2018.

(58) Field of Classification Search
USPC .......................................................... 707/769
See application file for complete search history.

(56)                      References Cited

U.S. PATENT DOCUMENTS

| | | | | |
|---|---|---|---|---|
| 10,423,616 | B2 * | 9/2019 | Li ........................ | G06F 16/2264 |
| 11,151,197 | B2 | 10/2021 | Higgins et al. | |
| 11,816,164 | B2 | 11/2023 | Higgins et al. | |
| 12,248,519 | B2 | 3/2025 | Higgins et al. | |
| 2017/0011098 | A1 * | 1/2017 | Tsirulnik .............. | G06F 16/221 |
| 2018/0039399 | A1 * | 2/2018 | Kaltegaertner ....... | G06F 16/248 |
| 2024/0037152 | A1 | 2/2024 | Higgins et al. | |

OTHER PUBLICATIONS

U.S. Pat. No. 11,816,164, Enhanced Processing of Time Series Data via Parallelization of Instructions, Nov. 14, 2023.
U.S. Appl. No. 18/483,042, Enhanced Processing of Time Series Data via Parallelization of Instructions, filed Oct. 9, 2023.

\* cited by examiner

Time Series Analysis System 100

Query 202

(1) search_results = seriesMetadata['sensor_name'].isin(['temperature','velocity'])
(2) search.series(search_results) \
(3) .map(time_range('2018-01-01', '2018-01-02')) \
(4) .map_by(interpolate(internal='linear', rename_columns_by = 'sensor_name'),
    'serial_number') \
(5) .to_dataframe() \
(6) .show(5)

User Device 120

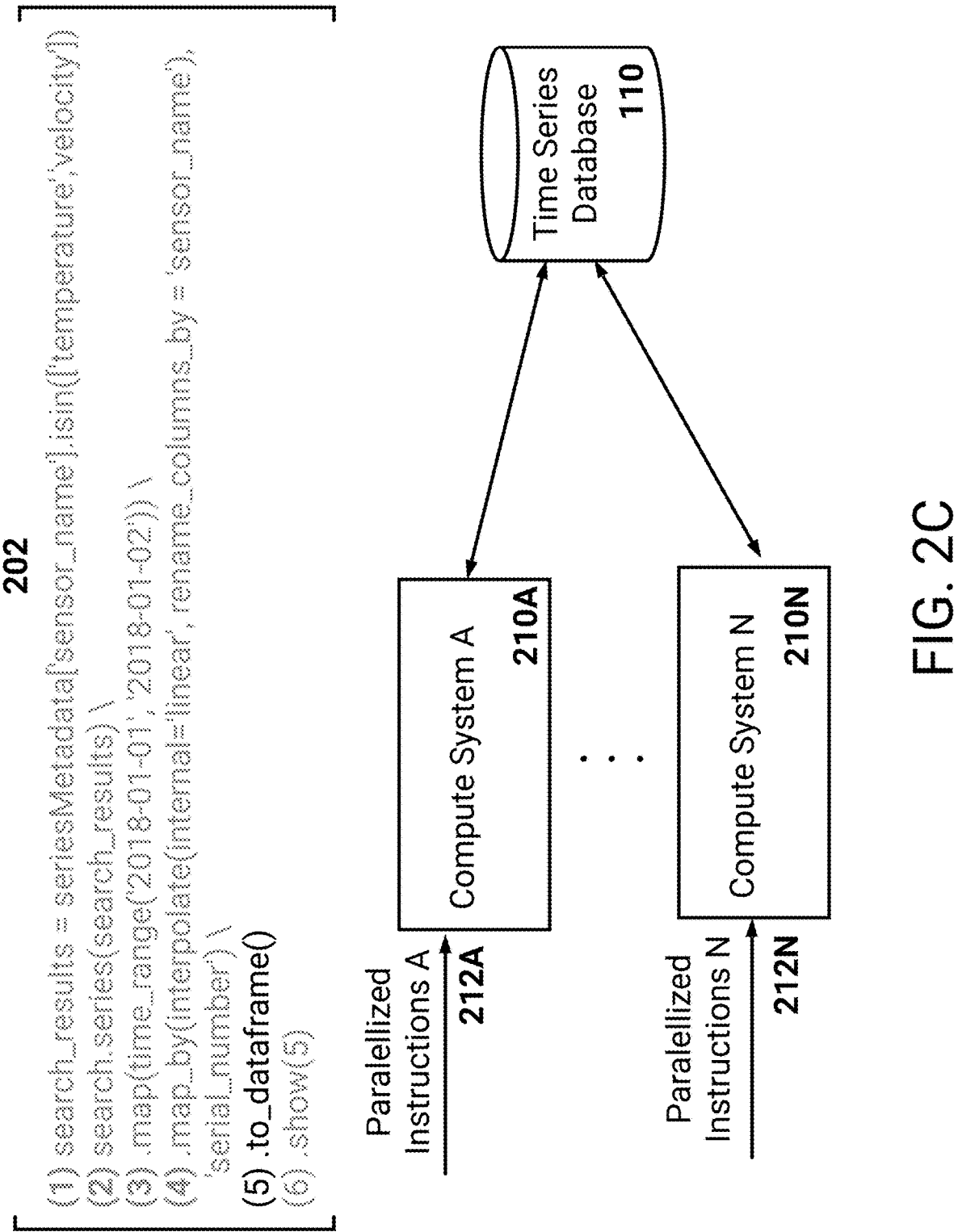

202

```
(1) search_results = seriesMetadata[sensor_name].isin([temperature','velocity'])
(2) search.series(search_results) \
(3) .map(time_range('2018-01-01', '2018-01-02')) \
(4) .map_by(interpolate(internal='linear', rename_columns_by = 'sensor_name'),
    'serial_number') \
(5) .to_dataframe()
(6) .show(5)
```

Parallellized Instructions A
212A

Compute System A
210A

Parallellized Instructions N
212N

Compute System N
210N

Time Series Database
110

302
Receive query incdicating time series datasets and operations to be performed 304
Identify nodes associated with query 306
Assemble nodes into query tree 308
Generate instructions for parallel processing based on query tree 310
Cause presentation of received results

400

402
Present interactive user interface

404
Receive user input specifying query related to analyzing time series datasets 406
Provide query to outside system for processing 408
Receive resulting data frame; optionally apply user-defined function(s)

410
Present resulting data frame in interactive user interface

ENHANCED PROCESSING OF TIME SERIES DATA VIA PARALLELIZATION OF INSTRUCTIONS

CROSS-REFERENCE TO RELATED APPLICATIONS

This application is a continuation of U.S. patent application Ser. No. 18/483,042, filed Oct. 9, 2023, and titled "ENHANCED PROCESSING OF TIME SERIES DATA VIA PARALLELIZATION OF INSTRUCTIONS," which is a continuation of U.S. patent application Ser. No. 17/450,924, filed Oct. 14, 2021, and titled "ENHANCED PROCESSING OF TIME SERIES DATA VIA PARALLELIZATION OF INSTRUCTIONS," now U.S. Pat. No. 11,816,164, which application is a continuation of U.S. patent application Ser. No. 16/533,016, filed Aug. 6, 2019, and titled "ENHANCED PROCESSING OF TIME SERIES DATA VIA PARALLELIZATION OF INSTRUCTIONS," now U.S. Pat. No. 11,151,197, which application claims priority to U.S. Provisional Application No. 62/733,515, filed Sep. 19, 2018, and titled "ENHANCED PROCESSING OF TIME SERIES DATA VIA PARALLELIZATION OF INSTRUCTIONS." Each of the above-recited applications are hereby incorporated by reference herein in their entirety.

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for processing time series data. More specifically, this disclosure relates to improvements in parallel processing of complex time series data, including usability improvements.

BACKGROUND

Sensors may be relied upon to record valuable information related to measuring physical information. As an example, a sensor can record velocity measurements of a vehicle. In this example, the sensor may periodically measure information indicative of velocity. Thus, the vehicle's velocity may be recorded every second, 5 seconds, and so on. As another example, a sensor can measure temperature within a structure. As another example, sensors may record occurrence of events. For example, a sensor may record a time at which freight trucks arrive at particular locations. Similarly, information may be recorded any time a user of a network performs certain actions (e.g., a time at which users accessed particular information, and so on).

In the above-described examples, values may be recorded along with timestamps at which the values were recorded. These recorded values may be stored, for example by a storage system, as a time series dataset. A time series dataset may thus, as an example, store velocity values of a particular vehicle or a multitude of vehicles. While these time series datasets may store valuable and, often, time-sensitive information, manipulating and analyzing the datasets presents great technological problems.

SUMMARY

Particular embodiments of the subject matter described in this specification can be implemented so as to realize one or more of the following advantages. A system described herein can cause time series datasets to be efficiently stored and can execute scalable queries against the time series datasets. Time series data may reflect any information that varies according to time, such as information measured or detected by sensors or information measured or detected via software (e.g., user actions on a network, log-ins, and so on). As an example, a sensor may monitor temperature of a vehicle's engines at a particular sampling rate (e.g., 1 second, 5 seconds, and so on). This monitored temperature information may be stored as time series data, with each temperature measurement associated with a corresponding time at which the temperature was measured. It should be appreciated that time series data may include very large datasets, for example due to high sampling rates. Additionally, these datasets may be continuously updated as new information is measured or detected.

Thus, since the time series data may be large, and may be continuously updated, the storing of time series data may present technological hurdles. Additionally, due to memory and processing constraints, efficiently determining information from stored time series data may be impossible for user devices. In this way, without the techniques described herein a user of a user device may be unable to query these continuously updating, and massive, datasets.

The system described herein can address, at least, these example technological problems based on its unique, and efficient, storing scheme. The system may further address these example technological problems based on its unique parallel processing scheme. As will be described, each time series dataset may be associated with a node (e.g., referenced by a node). For example, a node may point to a time series dataset as stored in a database or storage system. A user may provide queries for evaluation by the system, and the system may resolve nodes implicated by the query. Once the nodes are resolved, the system can parallelize the processing of the query.

As an example, a query may include information sufficient to identify three example time series datasets. Example information may include a unique identifier associated with the time series datasets or metadata describing the time series datasets. The system may utilize this information to resolve the nodes corresponding to these time series datasets. The query may further include one or more operations to be performed using the identified time series datasets. Examples of operations may include interpolating between different time series datasets, shifting time series datasets, scaling time series datasets, performing mathematical operations on the time series datasets, and so on.

With respect to the above-described query, the system described herein may generate a query tree comprising nodes associated with respective time series datasets and nodes associated with operations to be performed. As will be described, parent nodes of the query tree may indicate operations that are to be applied to child nodes associated with time series datasets. The system may then cause the processing of this query tree. Advantageously, the system may parallelize the processing of the query tree. For example, the system can generate parallelized instructions associated with the processing. The system can then provide the instructions to a multitude of outside systems for processing. As an example, the outside systems may form, at least part of, a compute cluster.

In this way, the system can service multitudes of queries received from different users. For example, the system can generate query trees for processing. Queries may therefore be analyzed, and nodes resolved, efficiently by the system. The compute cluster may then obtain time series datasets, and perform the processing described by a query tree. Through use of nodes, and therefore decoupling of the stored time series datasets from queries, the system may readily generate query trees for processing. Due to the parallelized processing of the query trees, the compute cluster may similarly more efficiently and readily process the instructions. In this way, responsiveness to user queries may be increased as compared with other schemes.

To enhance usability of the system, and enable complex queries to rapidly generated by users or systems (e.g., via application programming interfaces), a library may be leveraged. For example, the library may be written in one or more common programming languages (e.g., Python, C++, Java, and so on). As will be described, a user may utilize the library to create a query for processing. Since complex functionality may be masked by simple functions included in the library, the user can cause performance of complex analyses.

Therefore, the techniques described herein enable users to rapidly generate queries to be resolved by the system. The system may generate query trees based on received queries, and generate instructions to be executed in parallel by a compute cluster. Since the system can generate query trees via the abstraction layer of resolving nodes, the system can generate multitudes of query trees for opportunistic processing by the compute cluster. For example, the query trees may be batch processed subsequent to generation. Given the parallel nature of the generated instructions, the compute cluster may efficiently process each query tree. In this way, the compute cluster may leverage its greater memory and/or processing power to efficiently determine results associated with each query tree.

Various combinations of the above and below recited features, embodiments and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 2C is a block diagram illustrating the example time series analysis system processing a second portion of the query.

Like reference numbers and designations in the various drawings indicate like elements.

DETAILED DESCRIPTION

Overview

Figure 1:
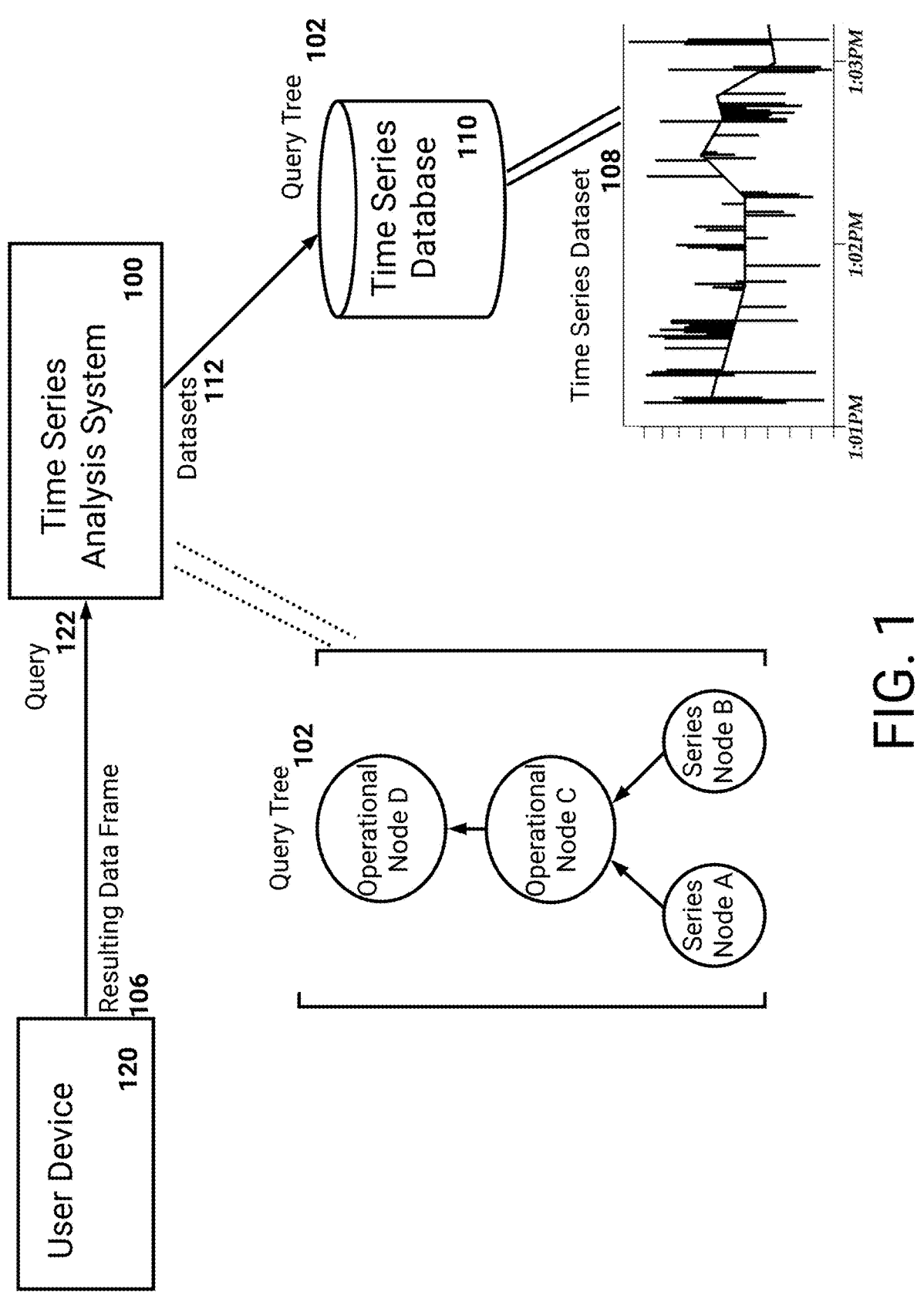
FIG. 1 is a block diagram illustrating an example time series analysis system, according to some embodiments of the present disclosure.

This specification describes schemes to efficiently service queries related to time series datasets. For example, as will be described a user may generate a query that indicates one or more time series datasets and one or more operations that are to be performed on, or with, the time series datasets. A system described herein (e.g., the time series analysis system 100) may service the query, and provide resulting information for presentation on a user device of the user. For example, the information may be presented in an interactive user interface configured to respond to user input. As will be described, the user may leverage one or more libraries (e.g., code libraries) associated with querying the time series datasets. Additionally, the system may optionally offload processing of the time series datasets to one or more compute systems (e.g., a compute cluster). In this way, the techniques described herein can enable users to rapidly receive complex analyses from otherwise impenetrable time series datasets. Additionally, the techniques described herein can enable the system to service multitudes of these queries through use of the compute systems.

It should be appreciated that a time series dataset may include information that varies according to time. For example, a time series dataset may include discrete information associated with respective timestamps. Example information may include values measured by one or more sensors. Example information may further include detection of events at different times. As an example, for each timestamp a time series dataset may record detection of a respective event from a set of events. Each time series dataset may record information at a particular periodicity or sampling rate. Example sampling rates may include 25 Hz, 60 Hz, 10000 Hz, and so on.

As will be described, each time series dataset may be stored in one or more databases or storage systems. The time series datasets may be associated with respective identifiers, which as described herein are referred to as nodes. Thus, each node may point to a location at which a corresponding time series dataset is stored. For example, a first node may point to a memory location in a first database and a second node may point to a memory location in a second database. Since a time series dataset may be quite large, the system may utilize the nodes to limit an extent to which the time series datasets need to be accessed. For example, a time series dataset may be one or more gigabytes, terabytes, petabytes, and so on.

In addition to being associated with a node, a time series dataset may be referenced according to metadata describing the time series dataset. Metadata may include particular properties or features of a time series dataset. The metadata may optionally include core properties, such as one or more of a name associated with a time series dataset, an identifier of the time series dataset, and a unit corresponding to the included values (e.g., km/h, Celsius, and so on). Furthermore, the metadata may be specified based on use-case. For example, with respect to a time series dataset measuring a vehicle's speed, metadata may include a manufacturer of the vehicle. As another example, with respect to a time series dataset measuring temperature, metadata may include location information associated with the measurements (e.g., global navigation satellite system coordinates). Optionally metadata may be specified by users of the system, for example a user may supply particular metadata as being associated with one or more time series datasets for storage. The metadata information may be utilized to identify a node corresponding to a particular time series dataset. For example, a user may generate a query which includes metadata and the system can identify one or more nodes corresponding to the metadata.

A query may be generated by a user device of a user, and provided to the system for processing. As will be described, the query may include information indicative of one or more time series datasets and one or more operations to be applied. To specify the query, the user may optionally utilize a web application which provides information to the system. For example, the user may utilize the user's user device (e.g., a laptop, tablet, mobile device, a thin client, and so on) to access the web application (e.g., via a web browser). As will be described, the web application may further present resulting information which is responsive to the query. Optionally, the user may utilize an application (e.g., an 'app'), or other software, executing on the user's user device to provide queries to the system. For example, the user device may transmit queries over a network (e.g., the internet) to the system for processing.

As will be described, the query may leverage one or more libraries (e.g., code libraries, such as Python, C++, and so on libraries) which enable complex functionality to be performed on time series datasets. For example, one or more functions may enable the user to specify particular time series datasets to be accessed. As an example, the user may indicate a unique identifier associated with a time series dataset. In this way, values included in the time series dataset may be utilized. As another example, one or more functions may enable the user to specify metadata. The system may utilize the metadata to search for one or more corresponding time series datasets. In this way, the user may rapidly specify information to indicate time series datasets that are to be utilized for processing the query.

As described above, the query may further indicate operations to be applied to time series datasets. Example operations may include mathematical operations, such as any linear or non-linear function which takes the time series datasets as an argument. Additional operations may include shifting or scaling the values included in the time series datasets. For example, a query may request that the values recorded in particular time series datasets are to be scaled according to a scaling factor. The scaling factor may be a constant specified by the user, or a value determined from the query or a prior query. As an example, the scaling factor may represent an average value (e.g., measure of central tendency) included in a particular time series dataset. The operations may further filter, or otherwise refine, the information included in time series datasets. For example, the query may specify a particular time range. In this example, only values corresponding to timestamps within the particular time range may be utilized to process the query. Additional examples of operations are described below, with respect to at least FIGS. 2A-2D.

Advantageously, the system may limit costly accesses to the time series datasets. For example, in contrast to accessing time series datasets identified in a query, the system can resolve nodes which are implicated by the query. Via resolving the nodes, the system may prepare the query for processing (e.g., by a compute cluster), while avoiding the great memory and processing requirements associated with the processing. As described herein, resolving a node includes identifying a specific node which points to a time series dataset associated with a query. For example, as described above one or more functions may be utilized in a query to specify an identifier of a time series dataset. In this example, the system may utilize the identifier to resolve a node which corresponds to the time series dataset. As another example, a query may include metadata. In this example, the system may search for a node corresponding to time series datasets which satisfies the metadata. In this way, the system can identify all nodes corresponding to time series datasets which are to be accessed for processing a query.

Furthermore, the system can generate nodes which correspond to the operations to be applied to the time series datasets. As will be described, these nodes (e.g., abstractions of operations) may be included in a query tree for processing. As an example, a node may be generated to cause the filtering of a time series dataset. Example filtering may include filtering to exclude values that do not correspond to timestamps within a particular range of times. As another example, a node may be generated to cause one or more derivatives associated with a time series dataset to be determined. Optionally, and as will be described, a user may define an operation to be performed on one or more time series datasets. For example, the user may define a function, such as a non-linear or linear function, to be applied. As another example, the user may define a Boolean or logical expression to be applied, at least in part, to the values included in one or more time series datasets. The system can thus generate a node based on the user indicated definition.

As another example, a node may be generated to cause interpolation of two or more time series datasets. In this example, the time series datasets may have different sampling rates. Therefore, new values for one or more of the time series datasets may be determined. For example, these values may be determined to cause the matching of the sampling rates. Thus, interpolation may refer to the generation of a set of values from a first set of values. Interpolation can include an estimation of a value within two known values in a sequence of values. Interpolation can further include determining a subset of values from a set of values. As an example, a first set of values for a first time series dataset may be incompatible with a second set of values for a second time series dataset. For example, there may be more values in the second set than the first set. Thus, the generated node can cause determination of a subset of the second set of values which are compatible with the first set of values. Interpolation may also cause performance of data normalization. For example, a first set of values for a first time series dataset may be incompatible with a second set of values for a second time series dataset based on the time unit of each respective time series dataset. Examples of data normalization may include applying a scaling factor to one or more of the time series.

As will be described, the system can generate a query tree which comprises nodes referencing time series datasets and nodes corresponding to operations. An example of a query tree is illustrated in FIG. 1, and described below. As described herein, the query tree can include parent nodes and child nodes, with the parent nodes optionally indicating operations to be performed on the time series datasets referenced by the child nodes. As will be described, complex strings of operations may be included in a query tree. In this way, the system may determine the operations and data which are to be processed. Processing may optionally be performed by compute systems, for example systems which form at least part of a compute cluster. In this example, the system may generate instructions associated with the query tree and provide the instructions to the compute systems. The compute systems may then determine a result associated with the query tree (herein referred to as a 'resulting data frame'). The resulting data frame may comprise a multitude of values, for example a time series dataset determined based on the query tree. The resulting data frame may also be a single value, such as a greatest element in one or more time series datasets.

Optionally, the system may parallelize the instructions. For example, the system may determine portions of the query tree which may be processed in parallel. These portions may, as an example, not be dependent on the calculation of other portions. As another example, the system may separate time series datasets into discrete datasets. In this example, the system may then cause different compute systems to perform operations on these discrete datasets. Additionally, for particular operations the system may cause one or more compute systems to receive results from other compute systems. The compute systems may then aggregate, or otherwise utilize, the received results to generate the resulting data frame.

The system may provide the resulting data frame to the user's user device for presentation. In implementations in which the system implements a web application, the system may update the content included in the web application to present the resulting data frame. Additionally, the user may request that the resulting data frame be downloaded to his/her user device. Optionally, serialization of data between the system and the user device may take place via a particular scheme, such as Apache Arrow. In this way, the system may package the resulting data frame via the particular scheme and then transmit the resulting data frame to the user device.

The resulting data frame may thus be presented on the user device in response to the query. As an example, the resulting data frame may be presented as a table. The table may include values corresponding to results of the operations applied to time series datasets. The presentation may also respond to user input. For example, the user may select particular columns or values to obtain more detailed information related to their calculation. Optionally, the user may select columns, rows, and so on to cause performance of additional operations. For example, a user interface (e.g., a pop up window) may indicate available operations. The user may then select from the available operations to further refine, or adjust, the presented information. Additional examples of presenting the resulting data frame will be described below.

FIG. 1 is a block diagram illustrating a time series analysis system 100, according to some embodiments of the present disclosure. The time series analysis system 100 may, as illustrated, receive a query 122 and transmit a resulting data frame 106 which is responsive to the query 122. As described above, the query 122 may indicate operations that are to be performed on time series datasets. The time series datasets may be stored in one or more databases or storage systems, such as in time series database 110.

It should be appreciated that the time series analysis system 100 may be a system of one or more computers, one or more virtual machine executing on a system of one or more computers, and so on. FIG. 1 illustrates the time series analysis system 100 as a block. As will be described below, with respect to at least FIG. 2C, the time series analysis system 100 may optionally represent a multitude of systems. Optionally, the functionality described by the below-systems may be performed by the time series analysis system 100. For example, the system 100 may include disparate modules that execute the functionality.

For example, the time series analysis system 100 may comprise a system configured to communicate with a user device 120 of a user. As described above, the system may implement a web application or be in communication with a web application. For example, the user may access a particular web page associated with the web application. Via interactions with the web page, the user can specify the query 122. Additionally, the user may receive the resulting data frame 106 for presentation on the user device 120 via the web page. Optionally, the user device 120 may execute an application, such as an 'app' obtained from an electronic application store. In this example, the application may generate user interface information for presentation on the user device. The application may further receive information from the system, for example the resulting data frame 106, and present the information within the application. This front-end system may optionally analyze the received query 122, and cause access to particular time series datasets and processing of the time series datasets. For example, the access and processing of time series datasets may be performed by one or more other systems.

As another example, the time series analysis system 100 may comprise a system configured to store, and enable access to, time series datasets. In this example, the system may aggregate, or receive aggregated, information from disparate sensors. This information may then be stored as respective time series datasets. For example, raw information may be provided to the system. This raw information may optionally be transmitted as a stream, for example to be received by the system and processed according to stream processing techniques. Optionally, the system may receive the raw data as one or more database tables, and store the raw data as a time series dataset. For each time series dataset, the system may associate particular features with the dataset. As an example, the system may associate one or more of a unique identifier, a name, a unit (e.g., a measurement unit), a sampling frequency, and so on. Optionally, the system may associate certain metadata with the time series dataset. For example, the metadata may be provided by a user or outside system which provides the raw data (e.g., sensor data). As another example, the metadata may be extracted from information received by the system. For example, the information may include a header, JavaScript object notation (JSON) file, XML information, and so on that indicates metadata.

As another example of a system, the time series analysis system 100 may comprise one or more systems configured to process instructions (e.g., a compute cluster). As will be described, these systems may respond to instructions generated by the system 100 based on the received query 122. The systems can access particular time series datasets 110 indicated in the query 122. The systems can then apply particular operations to generate the information to be included in the resulting data frame 106. The instructions may be parallelized, such that the systems may determine a portion of the information. For example, and as will be further described, each system may perform instructions related to a subset of the time series datasets and/or operations. As an example, if a query indicates that 100 time series datasets are to be processed, four systems may be utilized to query and store 25 time series datasets each.

As illustrated in FIG. 1, the user device 120 has provided a query 122 to the time series analysis system 100. While an example of a query is described in more detail below, with respect to FIGS. 2A-2D, it should be appreciated that the query 122 may include a multitude of instructions. For example, a user of the user device 120 may utilize one or more libraries to create code for execution by the time series analysis system 100. This code may comprise a series of instructions that leverage functions included in the libraries. Since these libraries may mask complex functionality related to processing time series datasets, the user may rapidly create the instructions. Therefore, the query 122 may include different defined functions, variables, and so on. The query 122 may additionally be written by the user in a particular programming language, such as Python. As will be described, the instructions included in the query 122 may be interpreted, or compiled, by the time series analysis system 100.

Optionally, the query 122 may be written in a query language. In this example, the user may create the query 122 according to SQL. As another example in which time series datasets are stored in graph databases, the user may create the query 122 according to Cypher, SPARQL, GraphQL, and so on. As another example in which time series datasets are stored in NoSQL databases, the user may create the query 122 according to an Application Programming Interface (API) utilized by the NoSQL database, map/reduce style querying, and so on. As an example, a query 122 may relate to time series datasets directed to deliveries between LA and San Francisco. The query may thus optionally be of a form similar to the following example: "SELECT [TIME SERIES DATASET]FROM DELIVERIES WHERE (SOURCE='LOS_ANGELES' AND DESTINATION='SAN FRANCISCO') OR (SOURCE='SAN FRANCISCO' AND DESTINATION='LOS_ANGELES')." This query 122 may cause generation by the time series analysis system 100 which can result in nodes representing the 100 time series described above.

While the query 122 may be written in a query language, it may present technological difficulties with respect to complex analyses. For example, the user may be unable to chain complex operations for processing by the time series analysis system 100. Advantageously, the user may utilize the libraries to generate complex code for execution by the time series analysis system 100. As an example, common workflows utilized by users may be packaged into one or more functions. In this way, the libraries can provide an interface to the efficient storage of time series datasets, and increase usability with respect to generating information based on the datasets. Examples of generating queries will be described in more detail below.

Optionally, the query 122 may be generated based on user input to a user interface presented on the user device 120. For example, the user may search for particular time series datasets (e.g., the user may enter an identifier, provide metadata, and so on). The user may then select (e.g., from a drop-down menu) particular operations that are to be performed on the time series datasets. These selections may then be translated into the query 122 for processing by the time series analysis system 100. As will be described, the query 122 can cause generation of a query tree 102 comprising nodes associated with time series datasets and operations. Optionally, the user interface presented on the user device 120 may enable the user to assemble nodes into the query tree 102. As an example, the user may select particular nodes, and drag them into a form representing the query tree 102. In this way, the user may easily view a graphical depiction of the query 122. In this example, the user device 120, or the time series analysis system 100, may validate the query tree assembled by the user. For example, the query tree may follow a particular format. An example format may include a node representing an operation being a parent to children node representing time series datasets.

With respect to the query 122 comprising instructions, for example which leverage libraries, the query 122 can indicate particular time series datasets. The time series analysis system 100 may analyze the query 122 and resolve nodes which point to the indicated time series datasets. As described above, in contrast to making costly network accesses to time series datasets, the time series analysis system 100 may identify nodes corresponding to the time series datasets. Optionally, the time series analysis system 100 may store information included, or otherwise associated with, the nodes. Example information associated with a node may include core features or properties associated with a time series dataset. For example, the node may include a unique identifier corresponding to a time series dataset. As another example, the node may include, or otherwise be associated with, metadata associated with a time series dataset. Additionally, each node may include a reference or pointer to a respective time series dataset. In this way, the time series analysis system 100 may resolve nodes that are implicated by, or otherwise identified in, the query 122.

As an example, the user may specify a time series dataset according to a unique identifier or unique name associated with the time series dataset. Furthermore, the user may specify an instruction which causes the time series analysis system 100 to search metadata associated with the time series datasets. With respect to searching metadata, the query 122 may include an instruction based on the following example code:

search_results = *SeriesMetadata*['sensor_name']].

$$isin(['temperature', 'velocity'] \&$$

$$(SeriesMetadata['manufacturer'] === 'CompanyA')$$

It should be appreciated that the above-recited query can cause the searching of metadata to locate nodes which satisfy the included constraints. For example, the nodes can point to time series datasets which include sensor values measuring 'temperature' or 'velocity,' and which were generated by sensors manufactured by 'CompanyA'. Since this search may return more than one node, the variable 'search_results' may thus reflect a collection of nodes. Advantageously, the time series analysis system 100 may handle processing of the collection of nodes without the user being aware of a number of nodes included in the collection. For example, operations may be applied to the 'search_results', and thus applied to the collection of nodes. As will be described, these operations may be performed in parallel such that processing time associated with the collection of nodes is reduced.

The time series analysis system 100 may resolve the nodes corresponding to time series datasets in parallel. For example, with respect to the example code recited-above, the time series analysis system 100 may perform multitudes of searches (e.g., in different processes, via different systems, and so on). Each search may optionally reflect a search of a particular subset of information (e.g., a subset of the nodes). Similarly, with respect to the query 122 identifying nodes according to unique identifier, the time series analysis system 100 may resolve the nodes in parallel. For example, the time series analysis system 100 may trigger generation of a process for each node, such that the nodes may be resolved in parallel (e.g., substantially parallel).

Additionally, the time series analysis system 100 can generate one or more nodes corresponding to the operations specified in the query 122. For example, the query 122 may indicate that a particular time range is to be utilized in filtering time series data. For example, the user can indicate a particular time range, such that values corresponding to timestamps outside of the particular time range are excluded from processing. As another example, the query 122 may indicate that two time series datasets are to be interpolated.

Example code to cause interpolation and filtering according to time range, for example leveraging a library, is recited below:

interpolate(internal = 'linear', frequency = '30 s')

([series1, series2]).time_range ('2017/10/02 01:35:00', '2017/10/02 01:40:00')

In the above-recited example, two time series datasets are indicated (e.g., 'series1' and 'series2'). Additionally, parameters associated with the interpolation are included. For example, the sampling rate is to be set at 30 seconds. As another example, the interpolation is to be a linear interpolation. Furthermore, the example indicates a particular time range to be utilized for filtering.

The time series analysis system 100 can thus assemble a query tree 102 comprising nodes associated with time series datasets and nodes associated with operations. An example of an assembled query tree 102 is illustrated in FIG. 1. In this example, two nodes (e.g., Series Node A and Series Node B) were indicated in the query 122. Additionally, two operations (e.g., Operational Node C and Operational Node D) were indicated in the query 122. For example, Operational Node C may correspond to the interpolation between the time series datasets associated with Series Node A and Series Node B. Additionally, Operational Node D may correspond to filtering the resulting information according to a specified time range. In this way, the nodes associated with time series datasets may be children nodes of nodes associated with operations.

While the example of FIG. 1 illustrates query tree 102, it should be understood that a query tree 102 may include additional nodes. For example, an example query may cause assembly of a query tree in which a node associated with a third time series dataset is a child to Operational Node D. In this way, the result of Operational Node C, and the node associated with the third time series dataset, may be children to Operational Node D. Additionally, multiple query trees may be generated by the techniques described herein. For example, FIG. 2B illustrates a query that causes multiple query trees to be generated. As will be described, each query tree may be processed in parallel (e.g., each by one or more compute systems or the time series analysis system 100, for example in respective processes or virtual processes).

Based on the query tree 102, the time series analysis system 100 can generate the resulting data frame 106. As described above, the time series analysis system 100 can resolve nodes to be included in the query tree. Thus, the time series analysis system 100 may access databases, and/or storage systems, storing the time series datasets pointed to by the resolved nodes. For example, the time series analysis system 100 may institute a call (e.g., a network call, such as over a virtual or local network) to a storage system based on an example resolved node. The storage system may then provide the corresponding time series dataset. As described above, the time series analysis system 100 may receive the time series dataset as a stream of values and corresponding timestamps. Optionally, the time series analysis system 100 may receive the time series dataset as a package, or may receive different portions packaged. In the latter example, the time series analysis system 100 may generate the time series dataset based on the portions (e.g., the time series analysis system 100 may aggregate the portions).

As illustrated in FIG. 1, the time series analysis system 100 has requested an example time series dataset 108 from the time series database 110. In the example figure, the time series dataset 108 is graphically represented as values varying according to time. However, it should be understood that the time series dataset 108 may be retrieved as the information stored in the time series database 110. With respect to the database 110 being a graph database, the time series dataset 108 may be referenced according to its corresponding resolved node. In this example, the time series analysis system 100 may therefore cause the transfer of the time series dataset 108 to the system 100. The time series analysis system 100 may store the time series dataset 108 in local storage for processing.

In this way, the time series analysis system 100 may obtain the time series datasets corresponding to the query tree 102. As will be described in more detail below, with respect to FIG. 2B, the time series analysis system 100 may determine a resulting data frame 106 based on the query tree 102. In implementations in which the time series analysis system 100 comprises compute systems, the system 100 may generate instructions associated with processing the query tree 102. The instructions may be parallelized, such that different compute systems may process a respective portion of the instructions. In implementations in which the time series analysis system 100 is in communication with compute systems, the system 100 may provide the instructions to the compute systems (e.g., via a local, wide area, or virtual network, or over the internet, and so on). For this example, the instructions can cause the compute systems to retrieve particular time series datasets. The instructions can then cause the compute systems to perform the operations indicated in the query 122. Thus, the time series analysis system 100 may direct the compute systems to process the query tree 102. The time series analysis system 100 may then receive results associated with the processed query tree 102. In some implementations, the time series analysis system 100 may aggregate the results from the compute systems to obtain a final result to be provided to the user device 120.

Since the final result may comprise a value, a time series dataset (e.g., adjusted or modified according to the query tree 102), or multiple time series datasets, the time series analysis system 100 may provide the final result as a resulting data frame 106 to the user device 120. The resulting data frame 106 may comprise the final result packaged according to an example scheme (e.g., Apache Arrow). Optionally, the information included in the resulting data frame 106 may be streamed to the user device 120. Optionally, the information may be provided as a single package, or in different portions, to the user device 120.

As described above, the time series analysis system 100 may implement a web application which is accessed by the user device 120. Optionally, in this example the resulting data frame 106 may be stored by the time series analysis system 100. The time series analysis system 100 may then update the user interface information presented on the user device 120 to present, at least, a portion of the resulting data frame 106. In this way, the user device 120 may avoid being required to utilize its own bandwidth, memory, and/or processing power, to access the resulting data frame 106.

Optionally, the user device 120 may define one or more functions to be applied to the results associated with the query tree 102. For example, the user of the user device 120 may define a function to perform an operation on the results. In implementations in which the resulting data frame 106 is streamed, the defined function may optionally be applied to the streaming information. For example, the user may cause a scaling of the values to be applied. Thus, the values may be sequentially scaled as the stream is received. Optionally, the user device 120 may apply the defined function as the resulting data frame 106 is received. Optionally, the time series analysis system 100 may apply the defined function, and provide the result to the user device 120. For example, the system 100 may provide the result as a download to the device 120, or present the results within the user interface presented on the device 120.

As described in FIG. 1, the time series analysis system 100 may receive queries, and provide results (e.g., in data frames) in response to the queries. An example query 202 is illustrated in FIG. 2A, the processing of which will be described in FIGS. 2A-2D.

Figure 2A:
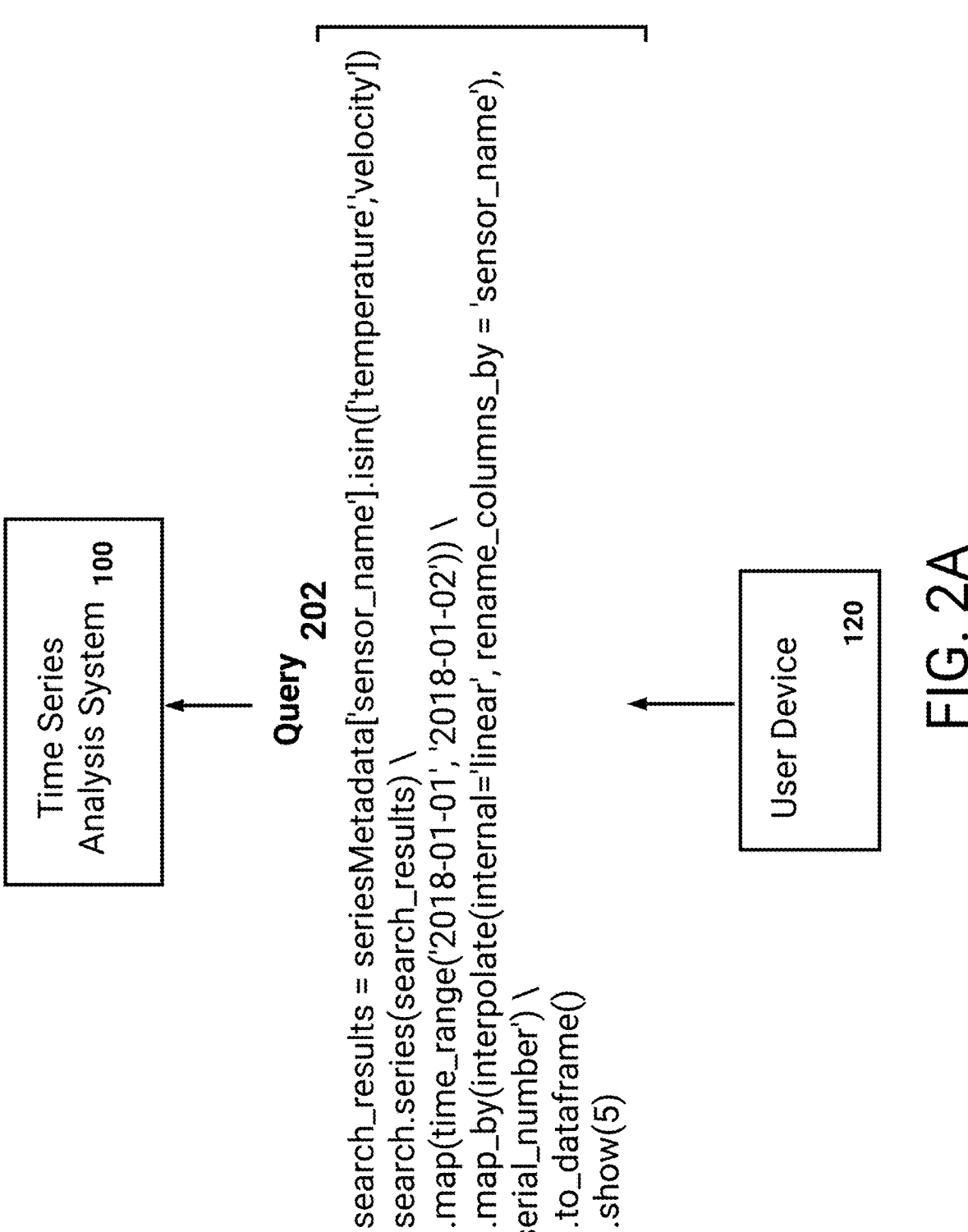
FIG. 2A is a block diagram illustrating an example time series analysis system receiving a query from a user device.
Figure 2B:
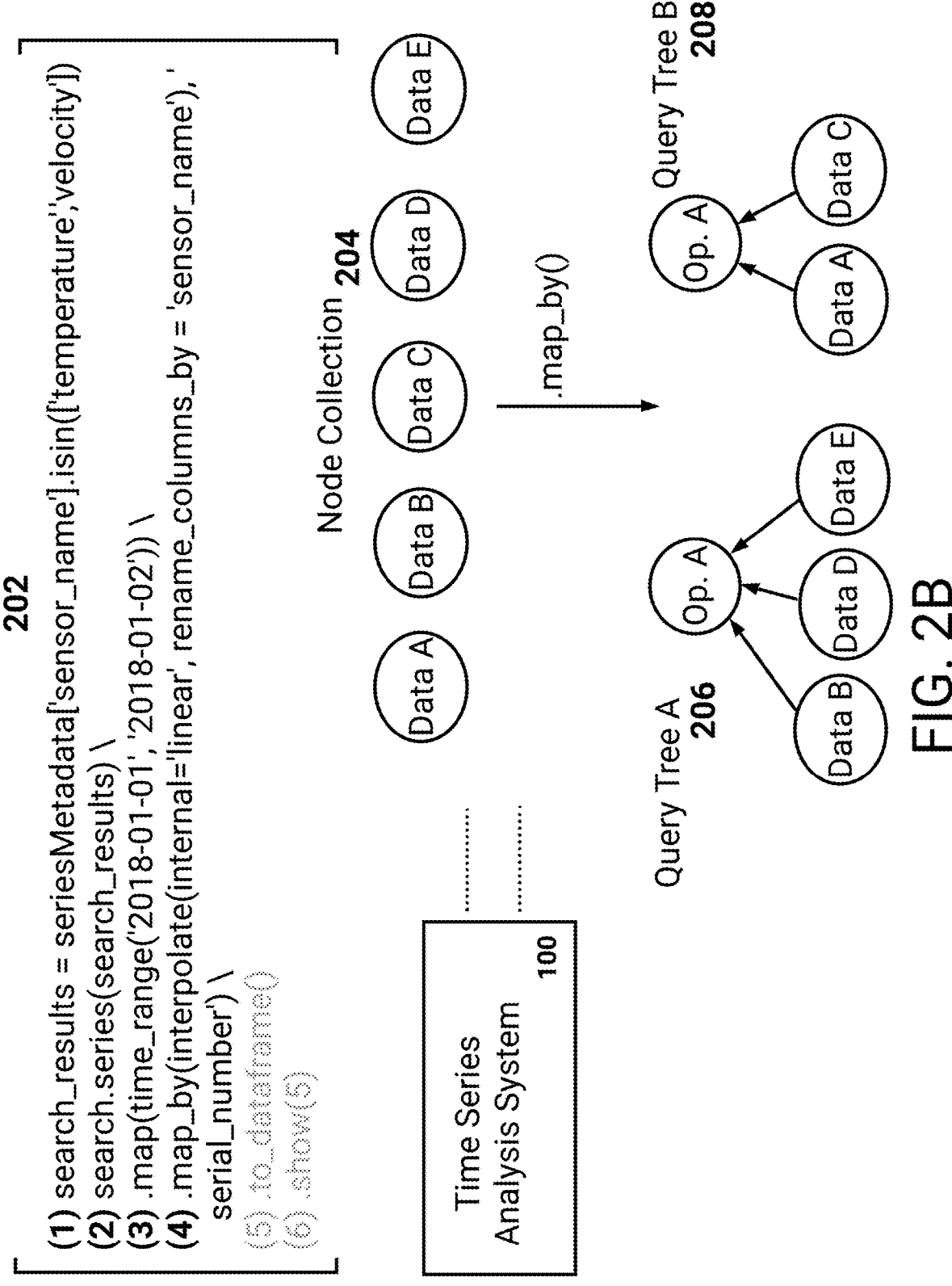
FIG. 2B is a block diagram illustrating the example time series analysis system processing a first portion of the query.

FIG. 2A is a block diagram illustrating an example time series analysis system 100 receiving a query 202 from a user device 120. The example query 202 is a representation of a query created utilizing a library associated with time series datasets. For example, the library may be created in a particular programming language (e.g., Python). As described in FIG. 1, a user of the user device 120 may utilize a user interface to create the query 202. As an example, the user may utilize a web application to indicate the instructions to be included in the query 202 (e.g., a web IDE or code editor). As another example, the user may utilize a local application on his/her user device 120 to indicate the query 202. The query 202 may then be provided to the time series analysis system 100.

As illustrated, the query 202 comprises a first portion (e.g. instructions (1)-(4)) which define, at the start, a search for particular nodes. For example, this first portion indicates particular constraints (e.g., particular metadata) associated with nodes. The time series analysis system 100 may comprise a metadata service, or other metadata engine or system, to identify nodes which satisfy the particular metadata. The metadata service may maintain metadata, or maintain locations at which metadata is stored. The first portion further causes the time series analysis system 100 to search for nodes based on the metadata. The first portion further causes the results of the search to be filtered according to time. For example, the 'map' function may apply a time range to timestamps included in the results of the search. In this way, timestamps outside of the time range may be excluded. The first portion further causes an interpolation (e.g., linear interpolation) of the time series datasets corresponding to the nodes returned in the search. In the example interpolation, the 'map by' function is utilized. The 'map by' function may apply the interpolation to nodes which match particular metadata. For example, FIG. 2A illustrates that the interpolation function is to be applied only to nodes which are associated with a same serial number (e.g., 'serial number'). Thus, the map function may filter values included in time series datasets according to a time range. The map_by function may then apply the interpolation operation only to the time series datasets with matching serial numbers.

The query 202 further comprises a second portion (e.g., instruction (5)). This second portion may cause the processing of the first portion. For example, compute systems may process the instructions included in the first portion to generate results. Examples of processing are described below, with respect to FIG. 2C. In the third portion of the query 202 (e.g., instruction (6)), the results associated with the processing may be presented. As will be described in FIG. 2D, the results presented on the user device 120 may thus match the metadata search and be filtered according to a time range. Additionally, the results may be ordered according to matching serial number.

FIG. 2B is a block diagram illustrating the example time series analysis system 100 processing a first portion of the query 202. As described in FIG. 2A, the query 202 includes a first portion (e.g., instructions (1)-(4)). This first portion can result in example query trees (e.g., query trees 206-208) associated with processing the first portion. As illustrated, instruction (1) indicates particular metadata for which nodes are to be searched. The metadata indicates that nodes which point to time series datasets including measures of either 'temperature' or 'velocity' are to be located. Instruction (2) then causes the time series analysis system 100 to search for nodes which satisfy the particular metadata.

The result of such a search is illustrated as node collection 204 (e.g., nodes A-E). As described in FIG. 1, the time series analysis system 100 can search for the nodes without accessing the time series datasets to which they respectively point. Thus, the time series analysis system 100 may obtain the node collection 204 to be assembled into one or more query trees.

As described in FIG. 2A, the first portion further indicates operations to be applied to the time series datasets corresponding to the node collection 204. For example, instruction (3) indicates that the time series datasets are to be filtered according to time. Thus, values corresponding to timestamps outside of the indicated time range (e.g., 2018-01-01 to 2018-01-02) are to be excluded. Additionally, instruction (4) indicates that an interpolation operation is to be applied to time series datasets associated with same serial numbers. Advantageously, this first portion may therefore be processed in parallel. For example, query trees 206-208 may be generated, with each query tree including nodes associated with a same serial number. Therefore, and as will be described below, the query trees 206-208 may be processed in parallel. As illustrated, query tree A 206 includes node B, node D, and node E. Thus, the operations indicated above may be performed on these nodes. Additionally, query tree B 208 includes node A and node C. Similarly, the operations indicated above may be performed on these nodes.

FIG. 2C is a block diagram illustrating the example time series analysis system processing a second portion of the query. As described in FIG. 2A, the second portion (e.g., instruction (5)) can cause processing of the prior instructions (e.g., instructions (1)-(4)). Example compute systems A-N 210A-210N are illustrated in FIG. 2C. As described in FIG. 1, the time series analysis system 100 may generate instructions associated with processing the query trees 206-208. These instructions may be parallelized, such that different systems (e.g., compute systems), or different processes (e.g., different threads, for example executing in one or more processors or virtual processors), may perform the instructions. Optionally, instruction (5) may indicate an extent to which the instructions are to be parallelized. For example, a user may indicate a number of different compute systems, or processes, which are to process the query 202. As another example, a user may indicate a number of processes or threads which are to process the instructions.

As illustrated in FIG. 2B, query tree A and query tree B were determined based on the first portion. The compute systems A-N may therefore determine portions of these query trees A-B. For example, a single compute system may process either query tree A or query tree B (e.g., based on received instructions 212A or 212B). As another example, multiple compute systems may process a same query tree. In this example, the compute systems may determine portions of the query tree. For example, the compute systems may each access the time series database 110 to obtain time series datasets corresponding to nodes included in the query tree. The compute systems may then determine respective portions of the result. Optionally, a compute system may aggregate the results of the portions, or the time series analysis system 100 may aggregate the results.

Figure 2D:
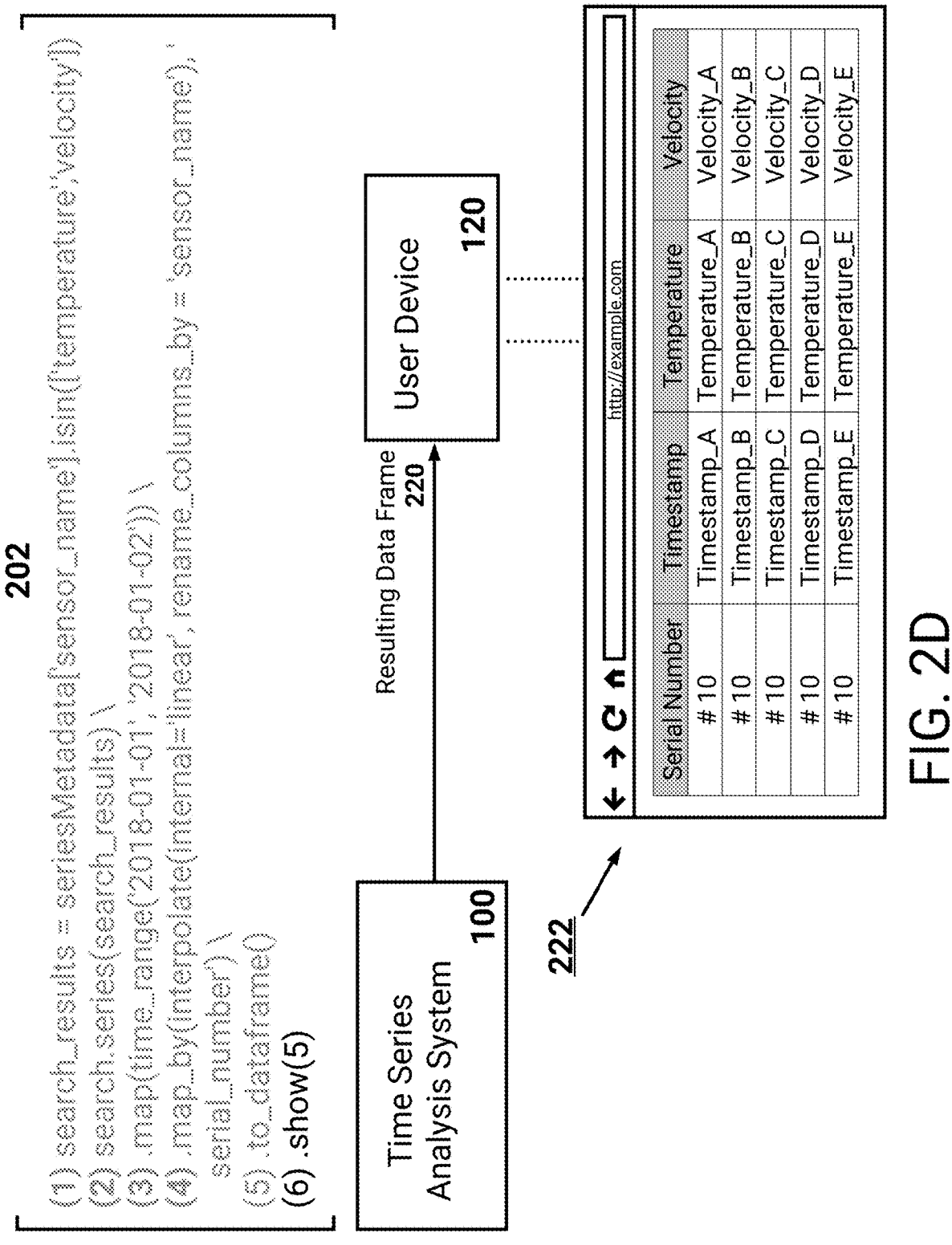
FIG. 2D is a block diagram illustrating the example time series analysis system processing a third portion of the query.

FIG. 2D is a block diagram illustrating the example time series analysis system processing a third portion of the query. The third portion of the query 202, as described in FIG. 2A, indicates that results of the instructions (1)-(5) are to be presented on the user device 120. In the example of FIG. 2D, the query 202 has indicated that five results are to be presented. The user may optionally indicate any value, or leave out a value such that all results are presented. The user device 120 may thus obtain a resulting data frame 220 for presentation on the user device 120.

As an example, the results may be presented as a table in an interactive user interface 222. This table may be configured to respond to user input (e.g., described below), such that the user may scroll through the table. Additionally, the user may select a particular column, row, or value, to obtain more detailed information related to the selection. As an example, upon selection of a particular temperature (e.g., 'Temperature_A') the user interface 222 may update to present a measure associated with the particular temperature. Example measures may include a measure of a difference between the particular temperature and an average temperature (e.g., with respect to the results in the user interface 222, with respect to all temperatures or temperatures associated with a certain user-definable context, and so on).

The example user interface 222 includes temperature and velocity values corresponding to sensors with a same serial number. For example, sensors with serial number '10'. As described in FIG. 2A-2B, the 'map by' function may be utilized to apply a same function to nodes with matching metadata. Thus, the 'map by' function caused nodes associated with serial number '10' to be located, and then interpolated. While not illustrated, it should be understood that additional serial numbers may be included below. For example, if the results were greater than 5 (e.g., as specified in instruction (6)), the user interface 222 may present temperature and velocity values associated with a different serial number.

As used herein in reference to user interactions with data displayed by a computing system, "user input" is a broad term that refers to any type of input provided by a user that is intended to be received and/or stored by the system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

Figure 3:
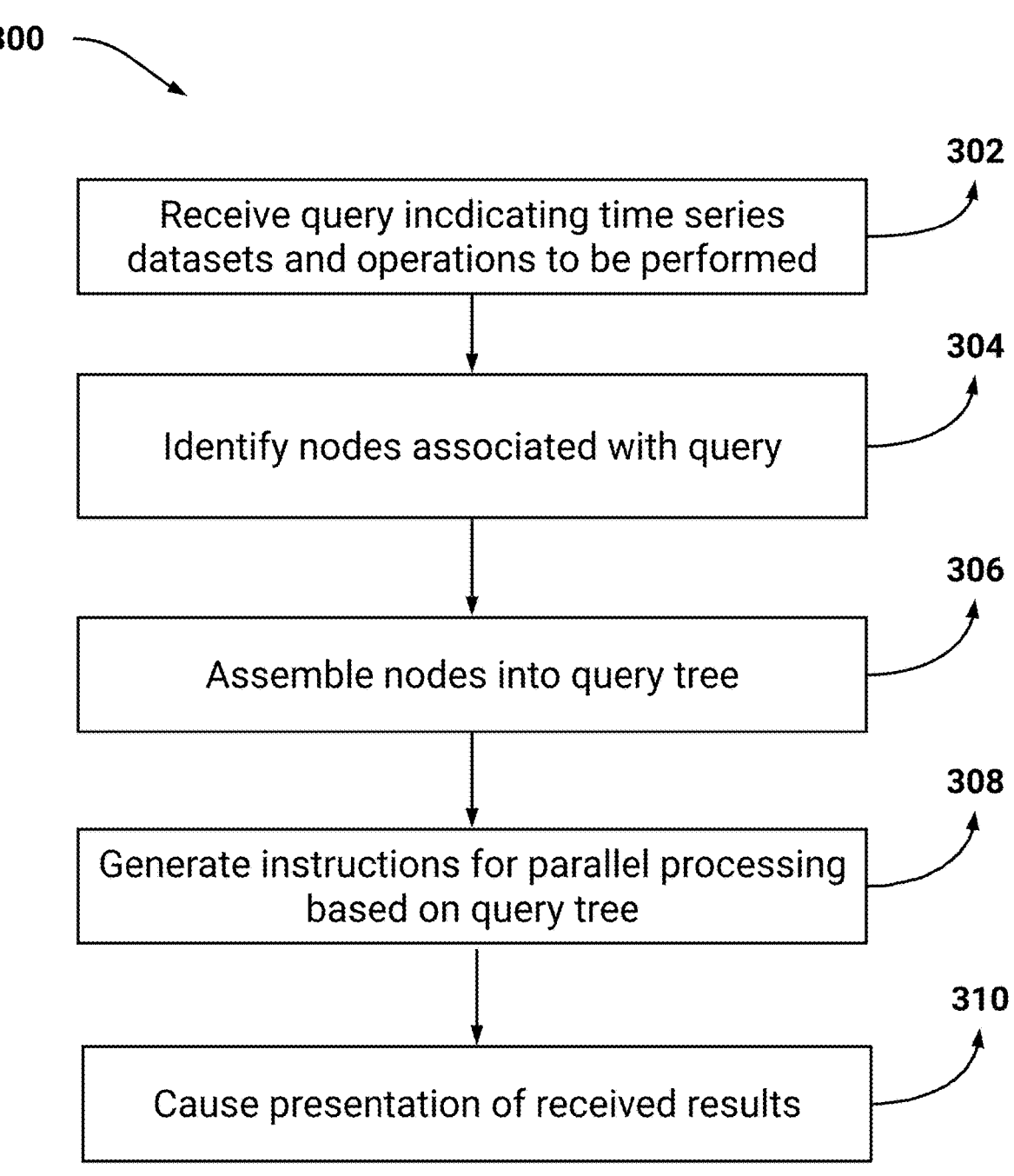
FIG. 3 is a flowchart of an example process for causing presentation of results associated with a received query.

FIG. 3 is a flowchart of an example process 300 for causing presentation of results associated with a received a query. For convenience, the process 300 will be described as being performed by a system of one or more computers (e.g., the time series analysis system 100).

At block 302 the system receives a query indicating time series datasets and operations to be performed. As described in FIGS. 1 and 2A-2B, a user may define a query to be provided to the system. For example, the query may include one or more instructions which optionally leverage functions defined in a library.

At block 304, the system identifies nodes associated with the query. The system may resolve nodes pointing to time series datasets. For example, the query may indicate unique identifying information (e.g., core properties) associated with time series datasets. Thus, the system may identify nodes with this unique identifying information. As another example, the query may include metadata. The system may search for nodes which satisfy this metadata. For example, the metadata may be maintained by a metadata service. The system may thus utilize the metadata service to identify any corresponding nodes. As described above, metadata may be supplied by different users. Metadata may also be extracted from time series datasets, or from information present during importation (e.g., storage) of time series datasets. For example, a header or XML file may be utilized to extract metadata.

The system also generates nodes corresponding to operations indicated in the query. As described above, example operations may include, at least, filtering, interpolation, map functions, map_by functions, and so on. The system may generate nodes associated with these instructions for later processing.

At block 306, the system assembles the nodes into a query tree. The query tree can thus identify nodes associated with time series datasets and nodes associated with operations. As described above, optionally child nodes may be associated with time series datasets. A parent node of the child nodes may cause an operation to be performed on the time series datasets. A parent of the result of the operation may be another operation node. In this way, the query tree may chain together operations to be performed on time series datasets.

At block 308, instructions are generated for processing the query tree. As described in FIGS. 1 and 2C, the system may generate parallelized instructions to be processed. For example, the system may generate instructions for processing by one or more systems (e.g., compute system, such as a compute cluster). The instructions may cause the systems to obtain one or more of the time series datasets indicated in the query tree. Additionally, the instructions may then cause the systems to process the time series datasets according to the query tree (e.g., apply the indicated operations).

At block 310, the system causes presentation of received results. As illustrated in FIG. 2D, the system may provide the results of the query tree for presentation on the user device. For example, the results may be presented as a table within a user interface presented on the user device.

Figure 4:
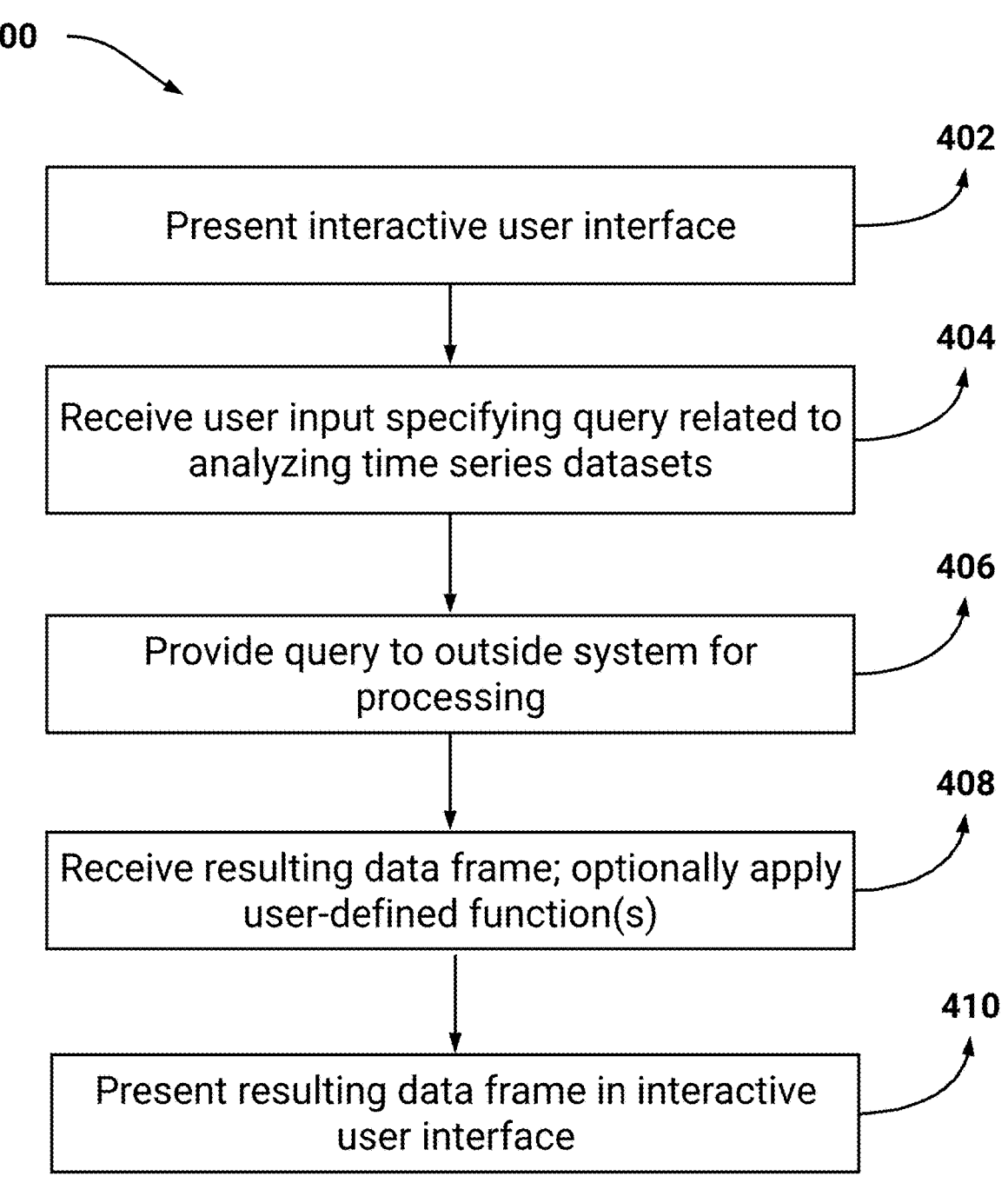
FIG. 4 is a flowchart of an example process for presenting results of a query in an interactive user interface.

FIG. 4 is a flowchart of an example process 400 for presenting results of a query in an interactive user interface. For convenience, the process 400 will be described as being performed by a user device of one or more processors (e.g., the user device 120).

At block 402, the user device presents an interactive user interface. As described above, the user device may execute an application which causes a user interface to be presented. Additionally, the user device may access a network location, such as a web page, which causes a user interface to be presented on the user device.

At block 404, the user device receives user input specifying a query related to time series datasets. As illustrated in FIG. 2A, a user of the user device may specify instructions associated with the query. For example, the user may type in the instructions, provide verbal input, and/or select from among graphical representations of instructions.

At block 406, the user device provides the query to a system for processing. The user device may transmit the query (e.g., over a network, such as the internet) to the system for processing. An example system is the time series analysis system 100 described above.

At block 408, the user device receives a resulting data frame. As described above, the results associated with the query may be provided to the user device via the system. As an example, the results may be provided in a data frame and/or streamed to the user device. Optionally, the user may define one or more functions to be applied to the results. The user device may apply the defined functions, or cause the system to apply the functions prior to the results being provided to the user device.

At block 410, the user device presents the results in an interactive user interface. The results may be presented, for example as a table as illustrated in FIG. 2D, via the user device. As described above, this user interface may be interactive such that the user can cause additional operations to be applied, obtain more detailed information, and so on.

Implementation Mechanisms

The various computing device(s) discussed herein, such as the time series analysis system 100, compute systems (e.g., system 210A), and/or the user device 102, are generally controlled and coordinated by operating system software, such as, but not limited to, iOS, Android, Chrome OS, Windows XP, Windows 7, Windows 8, Unix, Linux, or other compatible operating systems. In other embodiments, the computing devices may be controlled by a proprietary operating system. Conventional operating systems control and schedule computer processes for execution, perform memory management, provide file system, networking, I/O services, and provide a user interface functionality, among other things. The time series analysis system 100 may be hosted and/or executed on one or more computing devices with one or more hardware processors and with any of the previously mentioned operating system software.

Figure 5:
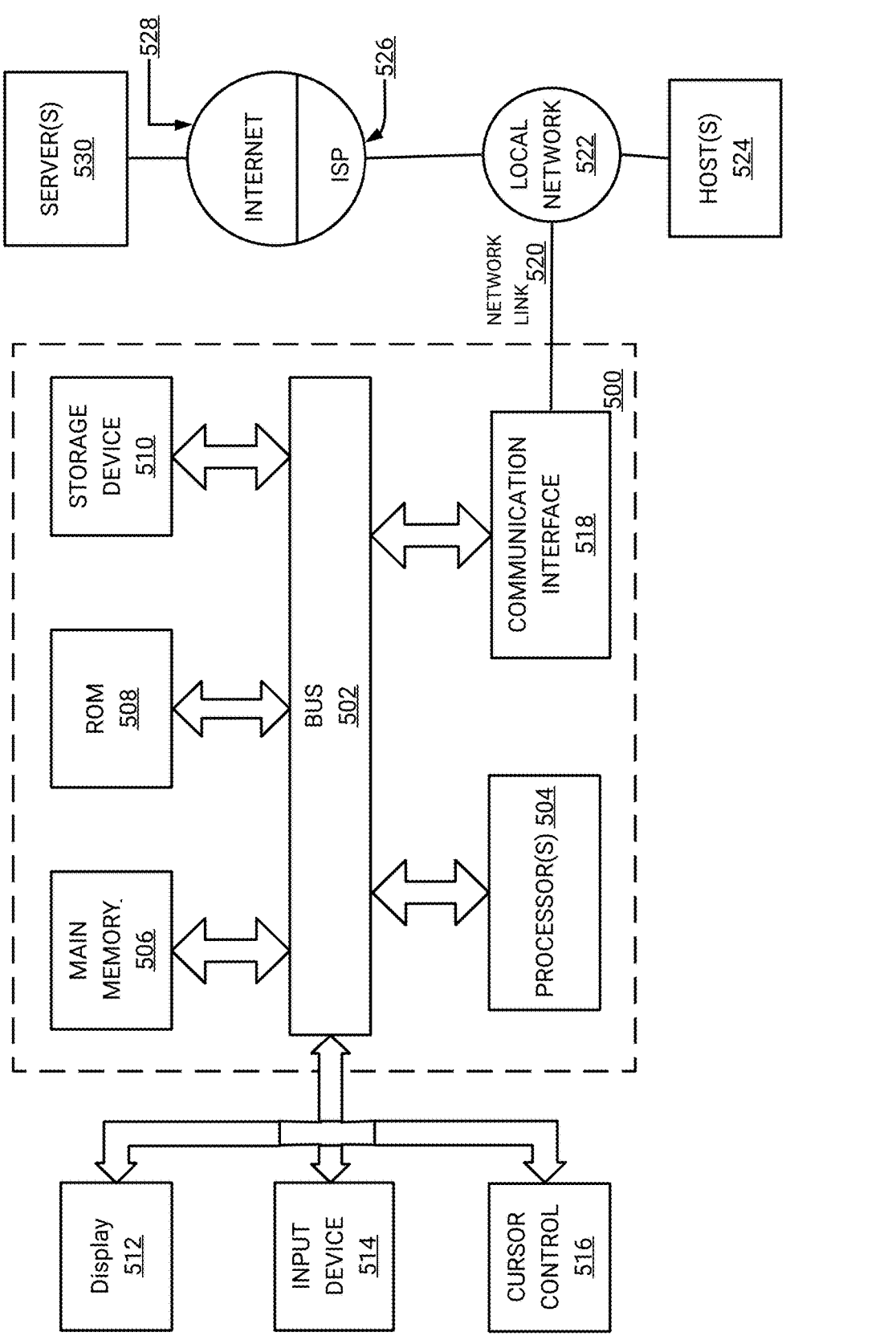
FIG. 5 is a block diagram that illustrates example components of an example time series analysis system.

FIG. 5 is a block diagram that illustrates example components of the time series analysis system 100. While FIG. 5 refers to the time series analysis system 100, any of the other computing devices, modules, services, and/or user computing devices discussed herein may have some or all of the same or similar components.

The time series analysis system 100 may execute software, e.g., standalone software applications, applications within browsers, network applications, etc., whether by the particular application, the operating system, or otherwise. Any of the systems discussed herein may be performed by the time series analysis system 100 and/or a similar computing system having some or all of the components discussed with reference to FIG. 5.

The time series analysis system 100 includes a bus 502 or other communication mechanism for communicating information, and a hardware processor, or multiple processors, 504 coupled with bus 502 for processing information.

The time series analysis system 100 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render the time series analysis system 100 into a special-purpose machine that is customized to perform the operations specified in the instructions. Such instructions, as executed by hardware processors, may implement the methods and systems described herein for generating and/or executing efficient queries.

The time series analysis system 100 further includes a read only memory (ROM) 508 or other static storage device coupled to bus 502 for storing static information and instructions for processor(s) 504. A storage device 510, such as a magnetic disk, optical disk, or flash drive, etc., is provided and coupled to bus 502 for storing information and instructions.

The time series analysis system 100 and/or user device 102 may be coupled via bus 502 to a display 512, such as an LCD display or touch screen, for displaying information to a computer user. An input device 514 is coupled to bus 502 for communicating information and command selections to processor 504. One type of input device 514 is a keyboard including alphanumeric and other keys. Another type of input device 514 is a touch screen.

In general, the word "instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The time series analysis system 100, or components of it, and/or the compute systems, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Bus 502 carries data to main memory 506, from which the processor(s) 504 retrieves and executes the instructions. The instructions received by main memory 506 may retrieve and execute the instructions. The instructions received by main memory 506 may optionally be stored on storage device 510 either before or after execution by computer hardware processor(s) 504.

The time series analysis system 100 also includes a communication interface 518 coupled to bus 502. Communication interface 518 provides a two-way data communication coupling to a network link 520 that is connected to a local network 522. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from the time series analysis system 100, are example forms of transmission media.

A network may comprise, but is not limited to, one or more local area networks, wide area network, wireless local area network, wireless wide area network, the Internet, or any combination thereof.

The time series analysis system 100 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor(s) 504 as it is received, and/or stored in storage device 510, or other non-volatile storage for later execution.

In some embodiments, the time series analysis system 100 and/or the user device 102 may operate in a distributed computing environment including several computer systems that are interconnected using one or more computer networks. The time series analysis system 100 and/or the user device 102 could also operate within a computing environment having a fewer or greater number of devices than are illustrated in FIG. 1 and/or FIG. 5. Thus, the depiction of time series analysis system 100 and/or the user device 102 in FIG. 1 and/or FIG. 5 should be taken as illustrative and not limiting to the present disclosure. For example, the time series analysis system 100 and/or the user device 102 could implement various Web services components and/or peer-to-peer network configurations to implement at least a portion of the processes described herein. For example, multiple servers and/or processes may process and/or analyze items and/or present a user interface in a distributed manner, as described herein.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method comprising:
by a system of one or more computers,
receiving a query indicating a plurality of time series datasets and operations to be performed on the plurality of time series datasets;
identifying nodes associated with the query, each node being associated with an individual time series dataset of the plurality of time series datasets, wherein nodes are identified based on metadata indicated in the query, and wherein identifying the nodes comprises:
accessing metadata information associated with the nodes; and
searching for nodes which satisfy the indicated metadata;
generating, based at least in part on the query, one or more nodes associated with respective operations performed on the plurality of time series datasets, wherein a first node of the one or more nodes causes transformation of two or more time series datasets of the plurality of time series datasets;
assembling the nodes into at least one query tree, wherein parent nodes of the at least one query tree indicate operations that are to be applied to child nodes;
generating instructions associated with processing the at least one query tree, whereby generating instructions based on the nodes decouples the at least two time series datasets from the query so as to enable processing of at least two nodes at least partly in parallel and to enable increased processing efficiency and responsiveness to the query; and
in response to receiving results associated with the generated instructions, presenting, in a user interface, the results.

2. The computer-implemented method of claim 1, wherein each node points to a location at which a respective time series dataset is stored.

3. The computer-implemented method of claim 1, wherein searching for nodes comprises utilizing a metadata service, the metadata service extracting metadata from time series datasets.

4. The computer-implemented method of claim 1, wherein assembling the nodes into at least one query tree comprises:
determining, based on a generated node, that an operation is to be applied to at least two sets of nodes associated with time series datasets;
identifying, based on the determination, nodes to be included in each of the at least two sets of nodes; and
assembling the respective sets of nodes into a respective query tree, wherein each query tree includes same nodes associated with operations to be performed.

5. The computer-implemented method of claim 4, wherein the nodes included in each set are associated with same metadata.

6. The computer-implemented method of claim 1, further comprising:
by the system of one or more computers,
accessing information indicating one or more user-defined functions to be applied to the results; and
applying the one or more user-defined functions to the results, wherein the one or more user-defined functions are applied sequentially to a stream of the results.

7. The computer-implemented method of claim 1, wherein the results are received as a data frame, and wherein the user interface presents the results as an interactive table responsive to user input.

8. A system comprising one or more computers and computer storage media storing instructions that, when executed by the system, cause the system to perform operations comprising:

receiving a query indicating a plurality of time series datasets and operations to be performed on the plurality of time series datasets;

identifying nodes associated with the query, each node being associated with an individual time series dataset of the plurality of time series datasets, wherein nodes are identified based on metadata indicated in the query, and wherein identifying the nodes comprises:

accessing metadata information associated with the nodes; and searching for nodes which satisfy the indicated metadata;

generating, based at least in part on the query, one or more nodes associated with respective operations performed on the plurality of time series datasets, wherein a first node of the one or more nodes causes transformation of two or more time series datasets of the plurality of time series datasets;

assembling the nodes into at least one query tree, wherein parent nodes of the at least one query tree indicate operations that are to be applied to child nodes;

generating instructions associated with processing the at least one query tree, whereby generating instructions based on the nodes decouples the at least two time series datasets from the query so as to enable processing of at least two nodes at least partly in parallel and to enable increased processing efficiency and responsiveness to the query; and in response to receiving results associated with the generated instructions, presenting, in a user interface, the results.

9. The system of claim 8, wherein each node points to a location at which a respective time series dataset is stored.

10. The system of claim 8, wherein assembling the nodes into at least one query tree comprises:

determining, based on a generated node, that an operation is to be applied to at least two sets of nodes associated with time series datasets;

identifying, based on the determination, the nodes to be included in each of the at least two sets of nodes; and assembling the respective sets of nodes into a respective query tree, wherein each query tree includes same nodes associated with operations to be performed.

11. The system of claim 10, wherein the nodes included in each set are associated with same metadata.

12. The system of claim 8, wherein the operations further comprise:

accessing information indicating one or more user-defined functions to be applied to the results; and applying the one or more user-defined functions to the results, wherein the functions are applied sequentially to a stream of the results.

13. The system of claim 8, wherein the results are received as a data frame, and wherein the user interface presents the results as an interactive table responsive to user input.

14. Non-transitory computer storage media storing instructions that when executed by a system of one or more computers, cause the system to perform operations comprising:

receiving a query indicating a plurality of time series datasets and operations to be performed on the plurality of time series datasets;

identifying nodes associated with the query, each node being associated with an individual time series dataset of the plurality of time series datasets, wherein nodes are identified based on metadata indicated in the query, and wherein identifying the nodes comprises:

accessing metadata information associated with the nodes; and searching for nodes which satisfy the indicated metadata;

generating, based at least in part on the query, one or more nodes associated with respective operations performed on the plurality of time series datasets, wherein a first node of the one or more nodes causes transformation of two or more time series datasets of the plurality of time series datasets;

assembling the nodes into at least one query tree, wherein parent nodes of the at least one query tree indicate operations that are to be applied to child nodes;

generating instructions associated with processing the at least one query tree, whereby generating instructions based on the nodes decouples the at least two time series datasets from the query so as to enable processing of at least two nodes at least partly in parallel and to enable increased processing efficiency and responsiveness to the query; and in response to receiving results associated with the generated instructions, presenting, in a user interface, the results.

15. The non-transitory computer storage media of claim 14, wherein each node points to a location at which a respective time series dataset is stored.

16. The non-transitory computer storage media of claim 14, wherein assembling the nodes into at least one query tree comprises:

determining, based on a generated node, that an operation is to be applied to at least two sets of nodes associated with time series datasets;

identifying, based on the determination, the nodes to be included in each of the at least two sets; and assembling the respective sets into a respective query tree, wherein each query tree includes same nodes associated with operations to be performed.

17. The non-transitory computer storage media of claim 16, wherein the nodes included in each set are associated with same metadata.

18. The non-transitory computer storage media of claim 14, wherein the operations further comprise:

accessing information indicating one or more user-defined functions to be applied to the results; and applying the one or more user-defined functions to the results, wherein the functions are applied sequentially to a stream of the results.

19. The non-transitory computer storage media of claim 14, wherein the results are received as a data frame, and wherein the user interface presents the results as an interactive table responsive to user input.

20. The non-transitory computer storage media of claim 14, wherein the metadata includes at least one of: an identifier of a time series dataset, a unit corresponding to values in a time series dataset, location information for data in a time series dataset, or a use-case of a time series dataset.

* * * * *